(12) United States Patent
Naouri

(10) Patent No.: US 6,781,953 B1
(45) Date of Patent: Aug. 24, 2004

(54) BROADCAST PROTOCOL FOR LOCAL AREA NETWORKS

(75) Inventor: Ygdal Naouri, Tel Aviv (IL)

(73) Assignee: Avaya Communication Israel Ltd., Tel Aviv (IL)

( * ) Notice: Subject to any disclaimer, the term of this patent is extended or adjusted under 35 U.S.C. 154(b) by 0 days.

(21) Appl. No.: 09/366,661

(22) Filed: Aug. 3, 1999

(51) Int. Cl.[7] ............................................. G01R 31/08

(52) U.S. Cl. ..................................... 370/218; 370/254

(58) Field of Search ............................... 370/401, 390, 370/432, 389, 254, 241, 244, 250, 216, 218

(56) References Cited

U.S. PATENT DOCUMENTS

| 5,878,232 | A | * | 3/1999 | Marimuthu | ............ | 395/200.79 |
| 5,946,308 | A | * | 8/1999 | Dobbins | ..................... | 370/392 |
| 5,982,775 | A | * | 11/1999 | Brunner | ...................... | 370/401 |
| 6,249,521 | B1 | * | 6/2001 | Kerstein | ..................... | 370/389 |
| 6,356,551 | B1 | * | 3/2002 | Egbert | ........................ | 370/389 |
| 6,438,129 | B1 | * | 8/2002 | Jennings | ..................... | 370/392 |

OTHER PUBLICATIONS

"Information technology—Telecommunications and information exchange between systems—Local and metropolitan area networks—Media Access Control (MAC) Bridges", International Standard ISO/IEC 15802–3, 1998, ANSI/IEEE Std 802.1D 1998 edition. pp. i–vii, xiii–xix, 58–121 and 280–287.

"Draft Standard P802.1Q/D9, IEEE Standards for Local and Metropolitan Area Networks: Virtual Bridged Local Area Networks", 1998. pp. 1–87.

"IEEE draft P802.3ad/D0.1, Supplement to Carrier Sense Multiple Access with Collision Detection (CSMA/CD), Access Method and Physical Layer Specifications: Link Aggregation", Dec. 30, 1998, pp. 1–62.

"IEEE P802.1s/D2—Draft Supplement to IEEE Standard P802.1Q—1999, Draft Supplement to Virtual Bridged Local Are Networks: Multiple Spanning Trees", 1999. pp. i–iv, 1–19, 21.

White Paper #1 of Lucent Cajun P550 Switch, pp. 1, 18, Oct. 1997.

Information Technology—Telecommunications & Information Exchange Between Systems—Local & Metropolitan Area Networks—Common Specifications Part 5: Remote Media Access Control (MAC) Bridging ISO/IEC 15802–5:1998(E) ANSI/IEEE Std 802.1G, 1998, edition, pp. 1–2, i–xv and 1–222.

* cited by examiner

Primary Examiner—Ajit Patel
Assistant Examiner—Chirag Shah
(74) Attorney, Agent, or Firm—Brian K. Dinicola

(57) ABSTRACT

A method of distributing a broadcast frame within a network. The method includes receiving the broadcast frame in a bridging-device of the network through a receiving port and forwarding the frame to a group of bridging-devices selected responsive to whether the receiving port is an internal port which leads to bridging-devices included in a common cluster with the receiving bridging-device.

27 Claims, 5 Drawing Sheets

BROADCAST PROTOCOL FOR LOCAL AREA NETWORKS

FIELD OF THE INVENTION

The present invention relates to communication networks and in particular to broadcast protocols in local area networks.

BACKGROUND OF THE INVENTION

Standard local communication networks comprise a plurality of bridging-devices and communication links. Each communication link connects between two or more bridging-devices or between a bridging-device and an end-station, e.g., a computer. Each bridging-device comprises a plurality of ports which serve as interfaces between the bridging-device and the links to which it is connected. When a source station sends a message to a destination station, the source station parses the message into frames and sends the frames to a nearest bridging-device which forwards the frames to one of its neighboring bridging-devices (bridging-devices which are directly connected by a common link are referred to herein as neighbors). The neighboring bridging-device forwards the frames to another bridging-device (which is its neighbor) until the frames finally reach the bridging-device connected to the destination station. In many cases, frames are broadcast to all the bridging-devices in a local network. In the context of the present application and claims the term "broadcast frames" refers to any frames which are to be distributed throughout the network, including broadcast and multicast frames and frames with a unicast address for which a bridging-device does not recognize the address.

One requirement imposed in many cases on bridging-devices is modularity, i.e., they do not require changes when the topology of the network changes, for example, by adding new bridging-devices. A standard broadcast scheme involves having a bridging-device, which receives a broadcast frame, forward the frame through all its ports, except for the port through which the frame was received. This broadcast scheme operates properly only if the bridging-devices and links do not form a loop in the network. If the network includes a loop, a single frame may be repeatedly sent through the network and the network will fail. Such a situation is commonly referred to as a broadcast storm. The term loop is taken to mean in the following description and claims, at least three bridging-devices connected by links which forward data, such that there are at least two different paths along non-parallel links between each pair of the bridging-devices.

In many cases redundant links are added to networks, to be used in case one or more of the bridging-devices and/or links fail. A spanning tree algorithm is commonly used to dynamically block the ports leading to the redundant links and thus prevent the formation of loops. One common spanning tree algorithm is the 802.1D standard spanning tree algorithm (STA) which is described in "Information technology—Telecommunications and information exchange between systems—Local and metropolitan area networks—Media access control (MAC) bridges", International Standard ISO/IEC 15802-3, 1998, ANSI/IEEE Std 802.1D, 1998 edition, the disclosure of which is incorporated herein by reference.

However, blocking the redundant links is wasteful in bandwidth since the redundant links could be used to pass messages and thus speed up the network operation. The blocking of redundant links is especially wasteful in networks which have a full-mesh topology and therefore may have many blocked links.

Many modern LAN bridging-devices support a feature named virtual local area networks (VLANs). Some or all of the messages sent through the network are given a VLAN ID which represents the VLAN to which the messages belong. The ports of the bridging-devices of the network are configured as active or blocking for each VLAN separately. VLANs allow a single physical network to operate as a plurality of independent networks. For example, a station may be connected to a network through a port in which only a VLAN X is enabled. The station therefore can only forward packets to, and receive packets from, stations which are connected to VLAN X. An emerging standard for VLANs is described in "Draft Standard P802.1Q/D9, IEEE Standards for Local and Metropolitan Area Networks: Virtual Bridged Local Area Networks", 1998, the disclosure of which is incorporated herein by reference.

"IEEE draft P802.3ad/D0.1, Supplement to Carrier Sense Multiple Access with Collision Depiction (CSMA/CD), Access Method and Physical Layer Specification: Link Aggregation", Dec. 30, 1998, pages 1–62, the disclosure of which is incorporated herein by reference, describes a scheme in which a plurality of parallel links, referred to as a Link Aggregation Group (LAG), connect between a pair of bridging-devices (and/or end stations). Broadcast frames sent between the pair of bridging-devices are always sent on only one of the links of the LAG, regardless of the source of the frame. A broadcast frame received through one of the parallel links is not forwarded through any of the parallel links so as to prevent the occurrence of a broadcast storm. This draft, however, only discusses broadcasting through parallel point to point links and does not describe avoidance of broadcast storms in bridged networks which include a plurality of links which connect between more than two bridging-devices and/or end stations.

SUMMARY OF THE INVENTION

It is an object of some preferred embodiments of the invention to provide a method for forwarding broadcast frames in a full-mesh-topology network, which method does not require blocking of links.

It is an object of some preferred embodiments of the invention to provide a method for forwarding broadcast frames in a network which includes loops, which method is free of the possibility of a broadcast storm.

It is an object of some preferred embodiments of the invention to provide a method for forwarding broadcast frames in a network which includes loops, which method is modular.

It is an object of some preferred embodiments of the invention to provide a method for aggregation of non-parallel links.

One aspect of some preferred embodiments of the present invention relates to restricting the distribution of broadcast frames, in full-mesh-topology networks and/or full-mesh-topology sub-networks (referred to herein as clusters). Bridging-devices, belonging to the full-mesh-topology cluster, forward broadcast frames according to the origin of the frames. Broadcast frames received by a cluster bridging-device from another cluster bridging-device are forwarded only to non-cluster bridging-devices. On the other hand, broadcast frames received from external bridging-devices (not belonging to the cluster) are preferably forwarded as usual through substantially all the ports of the receiving bridging-device (except the port through which the frame was received). Since the cluster bridging-devices are all connected to each other, when a first cluster bridging-device forwards a frame to a second cluster bridging-device the frame is also forwarded to all the other cluster bridging-devices. Therefore, the second cluster bridging-device does not need to send the frame to any of the cluster bridging-devices. The broadcast method described above avoids the generation of broadcast storms although the network includes physical loops.

One aspect of some preferred embodiments of the present invention relates to a broadcast protocol which operates in a cluster of a frame based local area network (LAN) which includes loops. Each bridging-device in the network forwards broadcast frames to neighboring bridging-devices according to a specific distribution table of the bridging-device. The bridging-devices to which the broadcast frames are forwarded are preferably determined responsive to the bridging-device from which the frames were received. The distribution tables are planned such that broadcast frames are forwarded to each of the bridging-devices in the cluster only once.

There is therefore provided in accordance with a preferred embodiment of the present invention, a method of distributing a broadcast frame within a network, including receiving the broadcast frame in a bridging-device of the network through a receiving port, and forwarding the frame to a group of bridging-devices selected responsive to whether the receiving port is an internal port which leads to bridging-devices included in a common cluster with the receiving bridging-device.

Preferably, forwarding to the group of bridging-devices includes forwarding through all the ports of the receiving bridging-device not including the receiving port, when the receiving port is not an internal port.

Preferably, forwarding to the group of bridging-devices includes forwarding through a group of ports which does not include internal ports of the receiving bridging-device, when the receiving port is an internal port.

Preferably, the bridging-devices of the cluster are connected with a full mesh topology. In a preferred embodiment, the cluster includes a stacked switch. Preferably, the bridging-devices of the cluster are controlled by a single processor. Alternatively, the bridging-devices of the cluster are each controlled by a separate processor.

Preferably, the group of bridging-devices is selected according to an entry to a forwarding table, which entry corresponds to an identity of the receiving port.

Preferably, forwarding to the group of bridging-devices includes, for frames received from a first bridging-device, forwarding to a second bridging-device which is not connected directly by an operative link to the first bridging-device. Preferably, the first and second bridging-devices are connected by an inoperative link.

Preferably, the group of bridging-devices is selected responsive to data with respect to connections between bridging-devices of the network, preferably, data on the failure of links. Preferably, the group of bridging-devices is selected according to an entry to a forwarding table which entry is selected responsive to the data with respect to connections of the network.

In a preferred embodiment, the group of bridging-devices is selected responsive to an identity of a bridging-device forwarding the frame to the receiving port.

There is further provided in accordance with a preferred embodiment of the present invention, a method of managing a cluster of bridging-devices and links including at least one loop of bridging-devices, including determining connectivity data with respect to connections between bridging-devices of the cluster, and blocking at least one link of the cluster for transmission of data frames, if the connectivity data fulfills a first condition, and not blocking any of the links of the cluster if the connectivity data fulfills a second condition.

Preferably, determining the connectivity data includes determining whether the cluster has a full mesh topology. Alternatively or additionally, determining the connectivity data includes determining a number of inoperable links in the cluster. Preferably, the first condition includes failure of at least a predetermined number of links in the cluster.

Preferably, blocking at least one link includes blocking a sufficient number of links so as to eliminate loops of unblocked links from the cluster.

There is further provided in accordance with a preferred embodiment of the present invention, a method of distributing a broadcast frame within a cluster of bridging-devices which includes at least one loop of unblocked nonparallel links and bridging-devices, including receiving the broadcast frame in a bridging-device belonging to the cluster, which bridging-device is part of the at least one loop, and forwarding the frame from the receiving bridging-device over at least one link which is part of the loop to neighboring bridging-devices.

Preferably, receiving the frame includes receiving the frame from a bridging-device external to the cluster. In a preferred embodiment, the cluster includes an entire local area network. Preferably, forwarding the link includes forwarding over a plurality of links which are part of the loop.

There is further provided in accordance with a preferred embodiment of the present invention, a method of distributing broadcast frames within a network by a bridging-device which has a plurality of ports leading to a plurality of neighboring bridging-devices, including receiving a broadcast frame through a receiving port, selecting fewer than all of the active ports in a group including one port for each neighboring bridging-device except for the bridging-device connected to the receiving port, independent of the contents of the frame, and forwarding the received broadcast frame through the selected ports.

Preferably, receiving the frame includes receiving the frame from a bridging-device included in a common cluster with the receiving bridging-device, the common cluster including at least one active loop.

Preferably, forwarding the frame includes forwarding the frame only to bridging-devices not included in the cluster.

Preferably, selecting the ports includes selecting responsive to an identity of the receiving port. Alternatively or additionally, selecting the ports includes selecting responsive to data regarding connections between bridging-devices of the network.

There is further provided in accordance with a preferred embodiment of the present invention, a method of distributing broadcast frames within a network by a bridging-device having a plurality of ports, including running at least one procedure which determines identities of ports which should be blocked to avoid having an unblocked loop in the network, and forwarding data broadcast frames through the ports which should be blocked according to all of the at least one procedures.

Preferably, running the at least one procedure includes running a single procedure.

Preferably, forwarding the frames includes forwarding through the links which should be blocked independent of the contents of the frames. Further preferably, forwarding the frames includes forwarding through the links which should be blocked independent of a VLAN with which the frames are associated.

Preferably, running the at least one procedure includes running a procedure which implements a spanning tree algorithm. Preferably, running the at least one procedure includes running a procedure which is implemented on substantially all the bridging-devices of the network.

Preferably, forwarding the data frames includes forwarding through ports of which identities were determined by the procedure only when a connectivity condition of the network is fulfilled. Further preferably, only when the network has a full mesh topology.

Preferably, the network has links and forwarding the data frames includes forwarding through ports of which identities were determined by the procedure only when all the links of the network are operative. Alternatively, forwarding the data frames includes forwarding through ports of which identities were determined by the procedure only if less than a predetermined number of links are inoperative.

There is further provided in accordance with a preferred embodiment of the present invention, a method of managing a cluster of bridging-devices within a network, including determining connectivity data with respect to connections between bridging-devices of the network, and changing the bridging-devices belonging to the cluster responsive to the connectivity data. Preferably, determining the connectivity data includes determining a failure of a link of the cluster.

Preferably, changing the bridging-devices included in the cluster includes removing a bridging-device from the cluster. Preferably, removing the bridging-device includes blocking ports of the removed bridging-device such that only a single port leads to the bridging-devices of the cluster.

Preferably, determining the connectivity data includes running a procedure which determines groups of bridging-devices which have a full mesh topology. Preferably, changing the bridging-devices included in the cluster includes adding a bridging-device to the cluster. Preferably, the bridging-devices of the cluster belong to a modular switch.

BRIEF DESCRIPTION OF FIGURES

The invention will be more clearly understood by reference to the following description of preferred embodiments thereof in conjunction with the figures, wherein identical structures, elements or parts are labeled with the same numeral in all the figures in which they appear, in which.

DETAILED DESCRIPTION OF THE PREFERRED EMBODIMENTS

Figure 1:
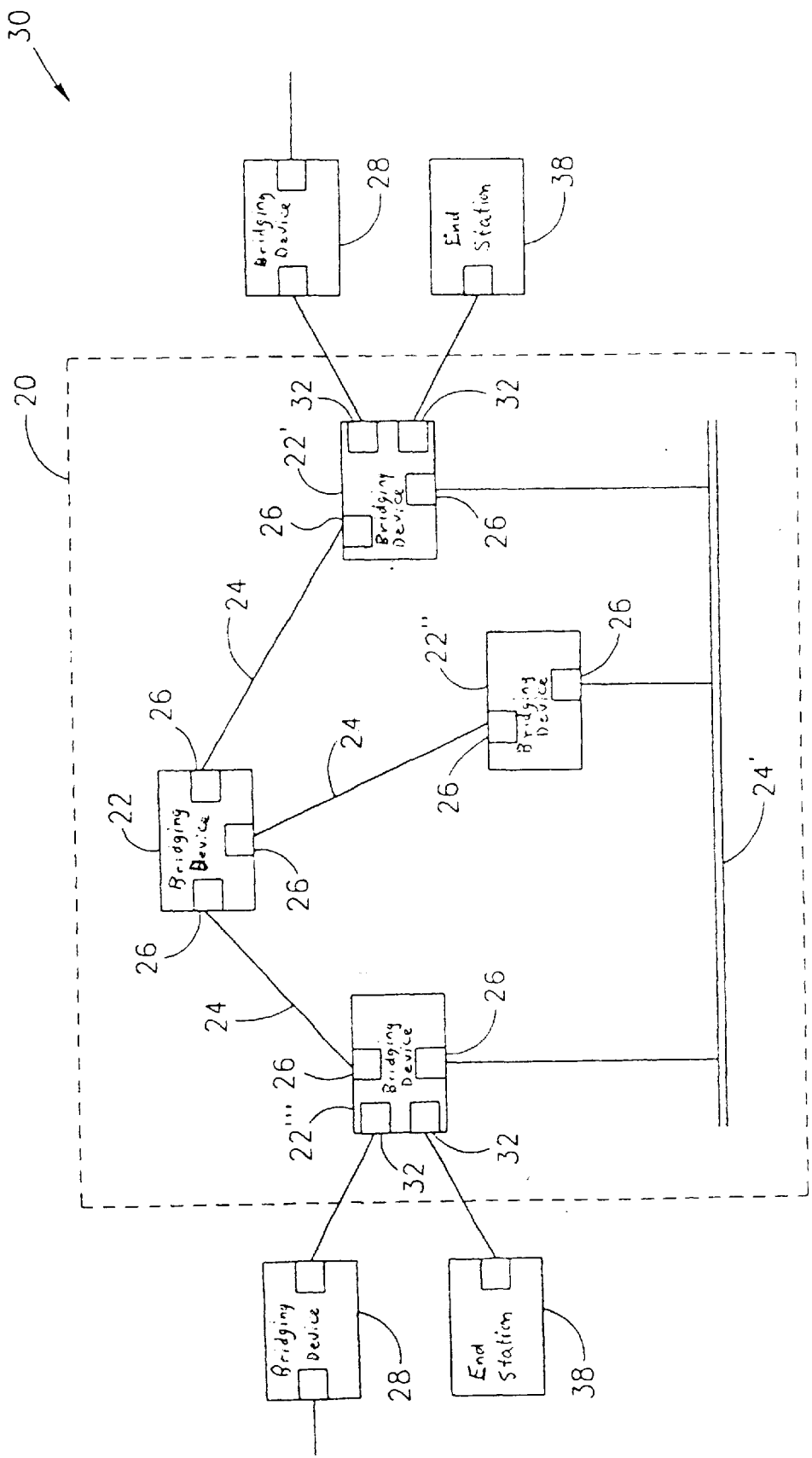
FIG. 1 is a schematic graph of a full-mesh-topology cluster within a network, useful in describing a preferred embodiment of the present invention.

FIG. 1 is a schematic graph of a full-mesh-topology cluster 20 within a network 30, useful in describing a preferred embodiment of the present invention. Network 30 is preferably a bridged local area network (LAN) which distributes frame based data, as described in the above mentioned International Standard ISO/IEC 15802-3, 1998 document. Network 30 comprises a plurality of bridging-devices 22 which belong to cluster 20. Bridging-devices 22 preferably operate at the layer 2 (data link layer) level of the seven layer OSI model, i.e., at the media access control (MAC) level. Although only one cluster is shown in FIG. 1, preferred embodiments of the present invention apply also to networks which include substantially any number of clusters 20. Bridging-devices 22 are connected through links 24 which connect two or more bridging-devices 22 within cluster 20. Each two bridging-devices 22 are connected by at least one link 24. Optionally, network 30 comprises external bridging-devices 28 which are not part of cluster 20. Each bridging-device 22 comprises, for each link 24 to which it is connected, a cluster port 26 which serves as an interface to the link. Other ports 32 lead to external bridging-devices 28 and/or to end stations 38.

Alternatively or additionally, cluster 20 may be viewed as an aggregation of links 24 rather than as a group of bridging-devices 22. In some preferred embodiments of the present invention, a single bridging-device 22 may include different ports 26 which belong to different clusters.

Cluster 20 may comprise, for example, a stacked switch which is formed internally from a group of switch modules. In some preferred embodiments the stacked switch includes a single processor which controls the operation of all of the bridging-devices 22. In other preferred embodiments, each bridging-device 22 comprises a separate processor which controls its operation. Alternatively, cluster 20 comprises an entire LAN. Preferably, bridging-devices 22 and 28 comprise standard switches, switch modules, bridges, and/or any other entity which directs frames. Further alternatively, cluster 20 comprises an end-station which includes a plurality of units for handling layer 2 communications, i.e., media access controllers (MACs). The layer 2 communications are preferably in accordance with the IEEE 802 standard for LANs, most preferably, in accordance with section 802.3 of the standard which relates to CSMA/CD MAC layers.

Preferably, links 24 which are connected to at least two bridging-devices 22 are not connected to external bridging-devices 28.

Figure 2:
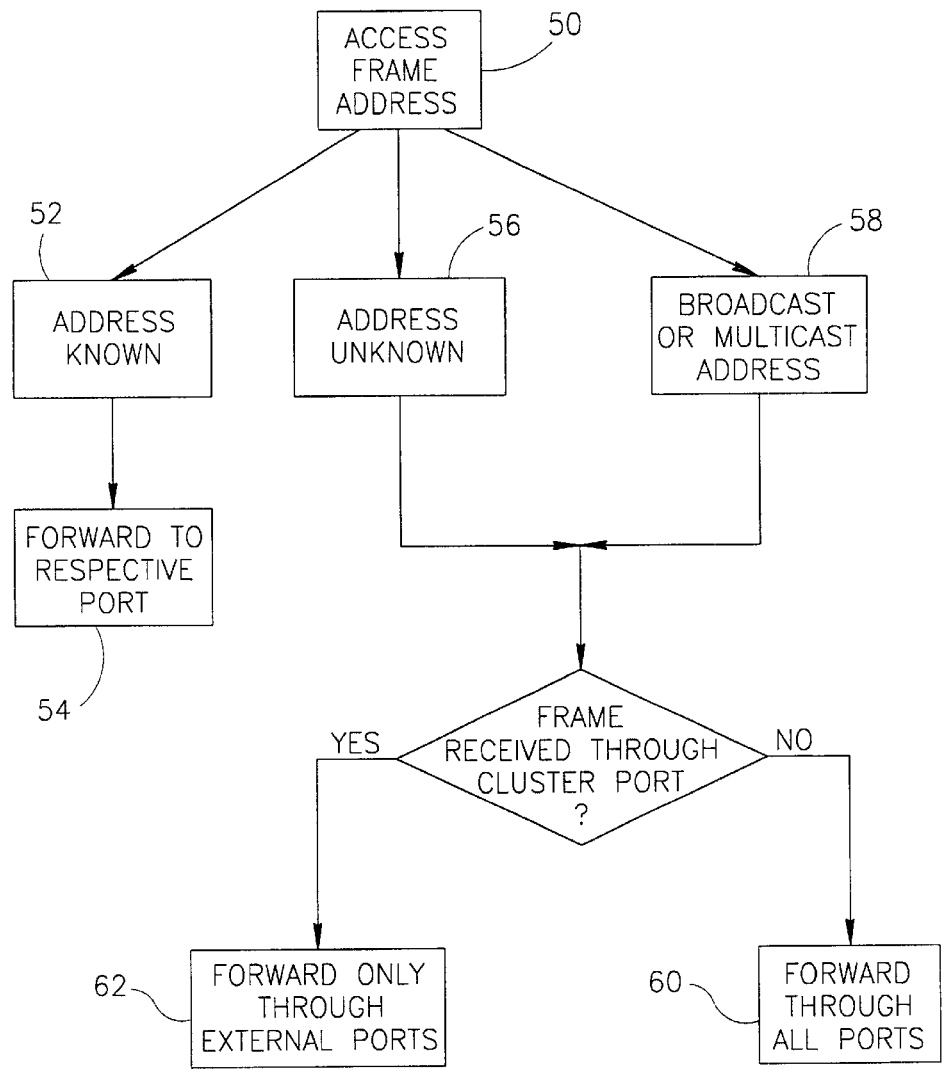
FIG. 2 is a flow chart of the actions performed by a cluster bridging-device upon receiving a data frame, in accordance with a preferred embodiment of the present invention.

FIG. 2 is a flow chart of the actions performed by a cluster bridging-device 22 upon receiving a data frame, in accordance with a preferred embodiment of the present invention. Bridging-device 22 accesses (50) an address field of the frame and compares the address to a list of addresses and respective ports stored within bridging-device 22. If the address is in the list (52) the frame is sent through the respective port (54). If the address is not in the list (56) the frame must be distributed throughout the network until a bridging-device recognizing the address is found. If the address is a broadcast or multicast address (58), the frame must be sent to all the bridging-devices 22 and 28 in network 30. It is noted that some broadcast and multicast addresses are directed to a sub-group of the bridging-devices 22, for example, to those bridging-devices which belong to a certain virtual local area network (VLAN). Normally, those frames are forwarded to all the bridging-devices 22 and 28 in the network and those bridging devices to which the frame is not directed ignore the frame.

If a broadcast frame was received through a port 32, the frame is forwarded (60) through all the ports 26 and 32 of the bridging-device except the port from which the frame was received. Such broadcast frames originate from a bridging-device 28 outside of cluster 20 and enter the cluster through a single bridging-device 22. This is because external bridging-devices 28 are not included in loops. Because the frame was not received yet by any of the other bridging-devices 22, forwarding the frame to all the other bridging-devices 22 within the cluster does not raise a danger that any of the cluster bridging-devices will receive the frame twice.

Similarly to frames from external, bridging-devices 28, and from end-stations 38, broadcast frames generated by the bridging-device 22 itself are forwarded through all the ports 26 and 32 of the bridging-device, since these frames were not received yet by any other bridging-device 22 and 28. Bridging-device 22 may generate, for example, management broadcast frames. Alternatively or additionally, one or more of bridging-devices 22 are replaced by end stations which include a plurality of layer 2 MACs. In this case the generated frames may originate from higher protocol levels of the end station.

If, however, the broadcast frame is received by a first cluster bridging-device 22 through a cluster port 26, the frame must have previously been in a second cluster bridging-device 22 and was already sent to all the other bridging-devices 22 in the cluster. Therefore, the frame is forwarded (62) only through ports 32 if the bridging-device has such a port.

It is noted that if a bridging-device 22 belongs to more than one cluster, broadcast frames received from a port of a first cluster are forwarded through all the ports of the bridging-device except the ports of the first cluster. This behavior can be viewed as an extension of the standard handling of broadcast frames. In the standard behavior, broadcast frames are forwarded through all the ports of the receiving bridging-device except for the receiving port.

In the extended behavior the bridging-devices of the cluster are regarded as a single bridging-device and therefore all the cluster ports are regarded as a single port. Therefore, a frame received through one of the cluster ports of the cluster is not forwarded through any of the cluster ports of the cluster.

In some preferred embodiments of the present invention, a spanning tree algorithm (STA) is performed in external bridging-devices 28 of network 30. Preferably, bridging-devices 22 in the cluster cooperate with the STA in a manner which forms a spanning tree which regards cluster 20 as a single bridging-device in network 30, for example as described in U.S. patent application Ser. No. 09/333,403 to Lior Shabtay and Benny Rodrig, filed Jun. 15, 1999, the disclosure of which is incorporated herein by reference. This application describes a method in which a cluster is regarded as a single bridging unit, preventing the STA from blocking internal links of cluster 20. Therefore, the STA prevents formation of an unblocked path of external links between a pair of bridging devices 22 in the cluster. This assures that a frame will not enter cluster 20 through two different bridging-devices 22.

In some preferred embodiments of the present invention, the method of FIG. 2 is implemented by defining a specific setup of VLANs in bridging-devices 22. In this embodiment, the frames do not include tags which identify the VLANs to which the frames belong. Preferably, each of links 24 belonging to cluster 20 is associated with a different VLAN, while the external links are all associated with a common VLAN different from the VLANs of the links 24 belonging to cluster 20. Frames received passing over a link are assumed to belong to the VLAN associated with the link. Each of links 24 of cluster 20 is blocked for all the frames except for those belonging to the VLAN of the external link. The external links on the other hand are open for all the VLANs. Thus, frames received from external links are passed through all the ports of the receiving bridging-device, while frames received through links 24 belonging to cluster 20 are forwarded only through external ports 32.

Figure 3:
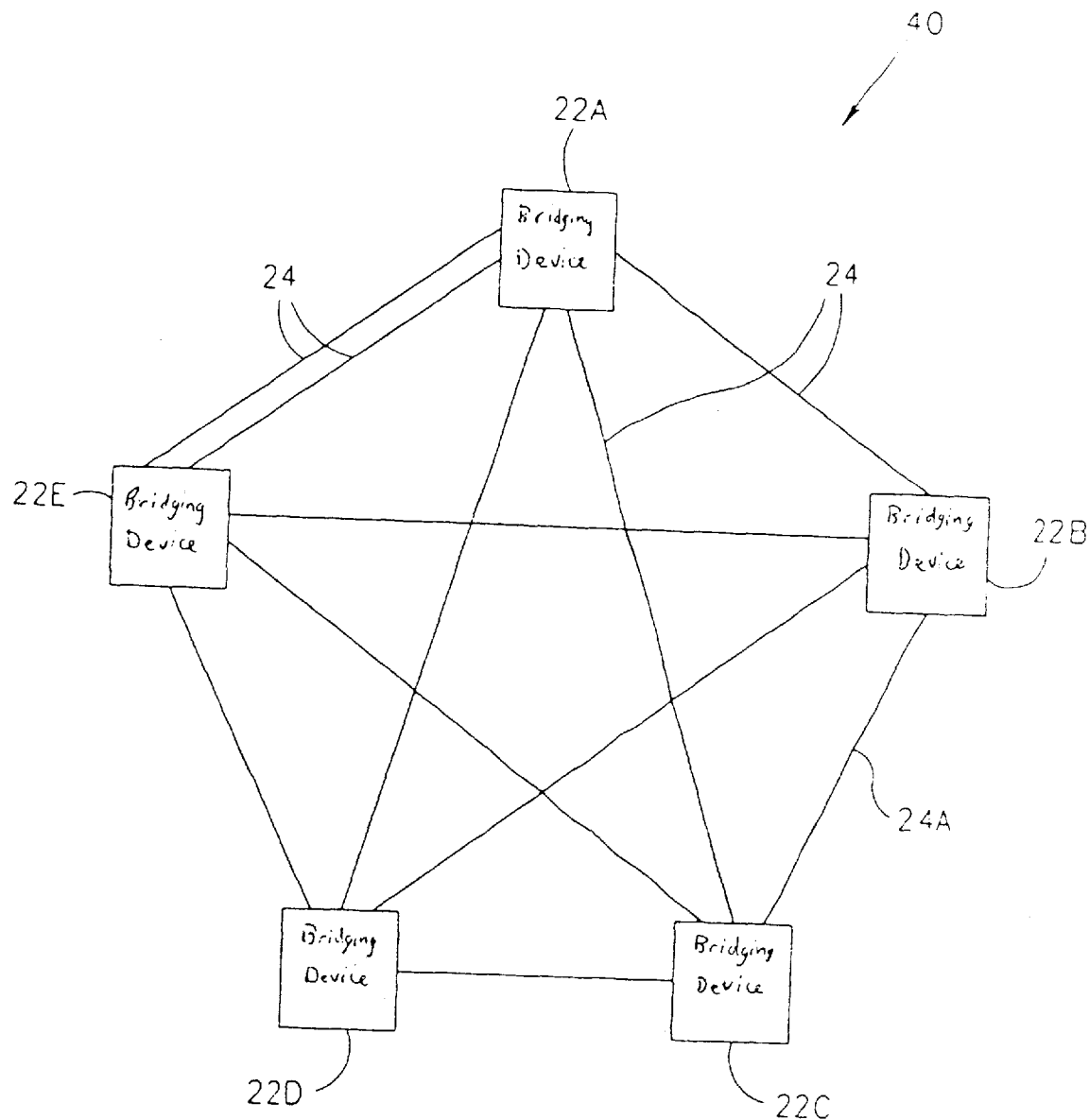
FIG. 3 is a schematic graph of a full-mesh-topology cluster, useful in describing a preferred embodiment of the present invention.

FIG. 3 is a schematic graph of a full-mesh-topology cluster 40, useful in describing a preferred embodiment of the present invention. Cluster 40 is similar to cluster 20 in its full mush topology, but adheres to an additional restriction, namely, each two bridging-devices 22 are connected by a point to point link 24 which connects only those two bridging-devices. This additional restriction is used to simplify the following descriptions of preferred embodiments. It is noted, however, that this restriction is not essential for the following described embodiments. Rather, a link which connects more than two bridging-devices 22 is equivalent to a plurality of point to point links which connect, with a full mesh topology, between the more than two bridging-devices 22. For example, in FIG. 1, link 24' connecting bridging-devices 22', 22" and 22''' is equivalent to three links, i.e., 22'–22", 22"–22''', and 22'–22'''. When such link 24' fails, it is preferably regarded as if all the equivalent point to point links failed. If only part of the link failed, for example the connection to bridging-device 22', the failure is regarded as if the equivalent links connected to bridging-devices 22' failed, i.e., links 22'–22", and 22'–22'''.

In some preferred embodiments of the present invention, the transmission protocol of FIG. 2 is altered upon detection of a failure in cluster 40 which causes a link 24 to become inoperative. The inoperative link 24 results from the failure of the link or from the failure of another element of cluster 40, such as the failure of a cluster port 26 leading to the link. The following discussion assumes that no traffic may pass on an inoperative link in any direction, but it will be obvious to those skilled in the art to apply the principles of the following discussion to failures which cause partial in-operativeness, such as unidirectional operation. It is noted that failure of a bridging-device 22, does not require any actions since the other bridging-devices 22 remain in a full mesh topology.

The parallel links illustrated in FIG. 3 between bridging-devices 22A and 22E preferably operate as a single LAG as described in the above referenced draft 802.3ad/D0.1 on LAG aggregation.

Figure 4:
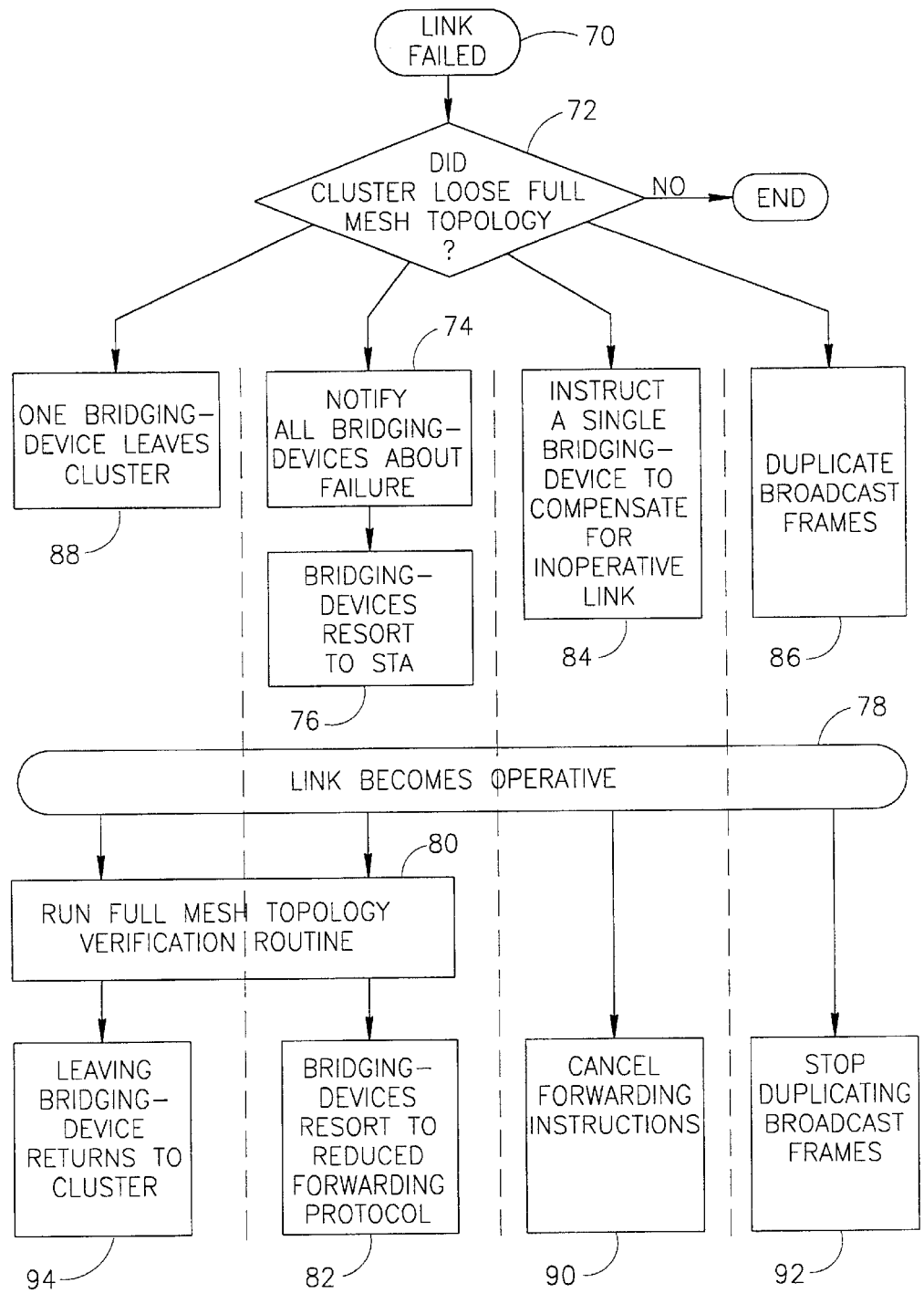
FIG. 4 is a flow chart of the actions performed by a bridging-device upon failure of a link, in accordance with some preferred embodiments of the present invention.

Reference is also made to FIG. 4 which is a flow chart of the actions performed by bridging-devices 22 of cluster 40 upon failure (70) of a link 24, in accordance with some preferred embodiments of the present invention. FIG. 4 illustrates four alternative methods of compensating for the failure. One method (74 and 76) involves dropping the use of the broadcast method of FIG. 2 and blocking a sufficient number of links 24 such that no loops exist in network 30. A second method (84) involves instructing one or more bridging-devices 22 not connected to the inoperative link to forward broadcast messages between the bridging-devices 22 connected to the inoperative link. In a third method (86) the bridging-devices 22 connected to the inoperative link send to each other messages with the contents of the broadcast messages. In a fourth alternative method (88) one of the bridging-devices 22 connected to the inoperative link leaves the cluster and blocks some of its links accordingly. The remaining bridging-devices 22 and links 24 remain in the cluster, and continue to use the broadcast protocol of FIG. 2.

When a link 24, for example link 24A, becomes inoperative, both bridging-devices 22 connected to the inoperative link 24A, i.e., 22B and 22C, identify the failure substantially concurrently. In some cases both bridging-devices 22B and 22C identify the failure independently. In other cases, one of the bridging-devices 22B or 22C identifies the failure and notifies the other of bridging-devices 22B and 22C about the failure in a low protocol layer (e.g. the physical layer), as is known in the art.

Alternatively, only one of the bridging-devices 22 connected to the inoperative link 24A, identifies the failure. In such a case the required actions of bridging-devices 22 due to the failure take into account that it is possible that either one or both of the bridging-devices 22B and 22C connected to the inoperative link identify the failure. Alternatively, one of the actions performed by bridging-devices 22B and 22C is to ensure that those bridging-devices 22 which need to know about the failure were informed.

Preferably, when a bridging-device 22 identifies a failure of a link 24, the bridging-device example, between bridging-devices 22A and 22E there are two links 24. Both links 24 must fail in order that cluster 40 will loose its full mesh topology. Preferably, if the full mesh topology is not lost no actions are taken. If the full mesh topology is lost due to the failure, as is the case when link 24A fails, action is taken to compensate for the failed link.

In a first alternative method (74, 76), the bridging-devices 22B and 22C which identify the failure preferably send (74) notification to this effect to all the bridging-devices 22 of cluster 40. Upon receiving the notification, all the bridging devices 22 preferably stop forwarding frames according to the above described transmission protocol and resort (76) to a spanning tree algorithm (STA). Preferably, the STA is common to all the bridging-devices 22 and 28 of the network. Alternatively, a separate STA is run on the bridging-devices 22 of cluster 40. Preferably, bridging-devices 22 run the STA whenever they are operative although they only use the results of the STA when there is an inoperative link 24 in the cluster 20. Thus, when a failure occurs bridging-devices 22 may immediately resort to the STA without waiting for the results of running the STA which may require many seconds in which the network is partially inoperative. Alternatively, the STA is run only after the inoperative link is identified.

Alternatively to having each bridging-device 22 resort to the STA immediately upon its receiving the notification about the failure, a common time is set in the notification of the failure at which all of bridging-devices 22 resort to the STA.

When link 24A is operative again (78), bridging-devices 22 preferably return to operate according to the reduced forwarding protocol of FIG. 2. Preferably, a bridging-device which identifies the operation of the failed link notifies the rest of bridging-devices 22 and they all return to the protocol of FIG. 2. Alternatively, a routine which verifies that cluster 40 has a full mesh topology is run (80) before returning to operate (82) according to the protocol of FIG. 2, in case more than one link failed and only one of the links became operative.

Preferably, if cluster 20 or 40 comprises a single processor which controls the operation of all of bridging-devices 22, the full mesh verification routine is run in the processor which has knowledge on the connectivity of the cluster. If, however, each bridging-device 22 has its own processor the verification routine is preferably a distributed routine.

In a preferred embodiment of the present invention, a distributed full mesh verification routine includes a step in which each bridging-device 22 determines how many cluster bridging-devices 22 are its neighbors. Such determination is preferably performed by sending suitable Bridge Protocol Data Units (BPDUs) through all the ports of the determining bridging-device 22. The BPDUs are not forwarded and therefore reach only directly connected neighbors. In a preferred embodiment of the present invention, each bridging-device 22 counts the number of BPDUs it receives and compares the number to a previously determined number of bridging-devices known to be in cluster 20. Alternatively, the cluster adheres to the requirements of cluster 40 and each bridging-device 22 verifies that it received a BPDU through each of its internal ports. Each bridging-device 22 then preferably notifies the rest of the bridging-devices 22 whether it is connected directly to all the other bridging-devices. In a preferred embodiment of the present invention, only bridging-devices 22 which are not connected to the rest of the bridging-devices send notification. If after a predetermined period no notification is received the bridging-devices 22 know that the cluster has a full mesh topology.

Referring back to sending (74) the notification about the failure to all of bridging-devices 22, the notification messages preferably state the identity of the link which failed or otherwise indicate that the messages from bridging-devices 22B and 22C relate to the same link. Thus, a bridging-device 22 receiving the notification knows that both messages relate to the same inoperative link.

In some preferred embodiments of the present invention, the notification about the failure is performed in a manner which ensures that all bridging-devices 22 receive the notification. Preferably, each of the bridging devices which identified the failure sends a broadcast message, internal to cluster 40, to all its neighbors. The bridging-devices receiving the notification preferably acknowledge the reception of the notification. Further preferably, the bridging-devices which identified the failure send unicast messages notifying the bridging-device or devices on the other side of the inoperative link about the failure. A unicast message is used to notify the other device because due to the failure this bridging-device does not receive the broadcast notification using the method of FIG. 2. For example, when bridging-device 22B identifies the failure in link 24A it sends a broadcast message to bridging-devices 22A, 22D and 22E. The receiving bridging-devices 22A, 22D and 22E do not forward the notification (under the existing protocol) because it was received from a cluster bridging-device 22.

Alternatively to sending a unicast message, after a predetermined period in which bridging-devices 22A, 22D and 22E switch to a forwarding scheme according to a spanning tree algorithm, bridging-device 22B resends the notification. The resent notification is forwarded along the spanning tree and therefore is forwarded also to bridging-device 22C.

Further alternatively, no special measures are taken to ensure that all bridging-devices 22 receive the notification. Even if bridging-device 22C, for example, does not receive the notification and continues to forward broadcast frames according to the transmission protocol of FIG. 2, cluster 40 will continue to operate substantially normally. Bridging-device 22C will receive all the broadcast frames forwarded in the network from the other bridging-devices 22, as bridging-device 22C is part of the spanning tree. A broadcast storm will not occur since even if a loop remains in cluster 40, bridging-device 22C is part of the loop and will not forward broadcast frames received from within cluster 40.

Referring to block 84, alternatively to sending (74) notification to all the bridging-devices 22 of cluster 40, one or more bridging-devices 22 of the network may compensate for the failed link 24A, preferably in a manner transparent to the rest of bridging-devices 22. Preferably, bridging-devices 22B and 22C which are connected by the failed link 24A instruct one or more of the other bridging-devices 22 to cover for the failed link 24A.

In a preferred embodiment of the present invention, bridging-device 22B instructs one of the other bridging-devices 22, for example bridging-device 22D, to forward frames received from bridging-device 22B to bridging-device 22C. All other frames are forwarded in accordance with the protocol of FIG. 2. Likewise, bridging-device 22C instructs (84) one of the other bridging-devices 22, to forward frames received from bridging-device 22C to bridging-device 22B. Preferably, both of bridging-devices 22B and 22C instruct the same bridging-device e.g. 22D. Alternatively, bridging-devices 22B and 22C instruct different bridging-devices 22 in order to distribute the traffic load between the links 24 of the network. Further alternatively, bridging-devices 22B and 22C choose the bridging-device 22 to be instructed, independent of each other.

In a preferred embodiment of the present invention, when bridging-device 22B identifies an inoperative link 24A it randomly selects another bridging-device (e.g. 22D) to pass messages between bridging-devices 22B and 22C. Preferably, bridging-device 22B sends a control message to bridging-device 22D requesting that it forward broadcast messages accordingly. If the selected bridging-device 22D is not connected to both of bridging-devices 22B and 22C it preferably responds that it cannot compensate for link 24A. Therefore, bridging-device 22B preferably requests from another bridging-device to compensate for the inoperative link, until a bridging-device which accepts the task of compensating is found. If all the bridging-devices 22 in cluster 20 cannot compensate for the inoperative link, the bridging-devices 22 preferably resort to the STA as described with reference to block 76.

In some preferred embodiments of the present invention, bridging-devices 22 manage forwarding tables which are used to determine to which bridging-devices a frame is to be forwarded. Preferably, each bridging-device from which broadcast frames are received has an entry in the table listing the bridging-devices to which the frame is to be forwarded. Preferably, when cluster 20 has a full mesh topology the entries of the table are in accordance with the reduced forwarding protocol of FIG. 2. That is, entries for external bridging-devices 28 list all the bridging-devices neighboring the bridging-device 22 having the table. Entries for cluster bridging-devices 22 list only neighboring external bridging-devices 28. When a failure is detected the tables are preferably updated to reflect the instructions described in the previous paragraph.

It is noted that such tables may be used also in networks which include a cluster which was not necessarily intended to have a full mesh topology. An example of such a network is described hereinbelow with reference to FIG. 5.

Alternatively to having both bridging-devices 22B and 22C which are connected by the failed link 24A instruct the one or more other bridging-devices 22, only one of bridging-devices 22B and 22C produces the instructions. Preferably, a predetermined rule, for example based on the MAC addresses of the bridging-devices, is used to determine which bridging-device connected to the failed link 24A produces the instructions. An exemplary rule assigns the bridging-device 22 with a lower MAC address to produce the instructions.

Preferably, when link 24A becomes operative, the bridging-devices 22 which produced the forwarding instructions reverse (90) the instructions.

Referring to block 86, in some preferred embodiments of the present invention, one or both of bridging-devices 22B and 22C which are connected by the failed link 24A compensate for the failed link, preferably in a manner transparent to the other bridging-devices 22. Preferably, bridging-devices 22B and 22C duplicate broadcast frames (86) which they forward. The duplicates of the frames are sent as unicast frames to the bridging-device on the other end of the failed link 24A. Preferably, the unicast frame is forwarded arbitrarily to any one of the other bridging-devices 22 which in turn forwards the unicast frame to its destination.

In a preferred embodiment of the present invention, each bridging-device 22 is assigned a special unicast address for broadcast frames forwarded to the bridging-device due to an inoperative link. The bridging-device 22 owning the special address responds to frames with the special address as to broadcast frames while the rest of the bridging-devices 22 respond as to a regular unicast address. Alternatively to using a special address, bridging-devices 22B and 22C on opposite sides of failed link 24A respond to unicast frames from each other as to broadcast frames. Further alternatively, the broadcast frames sent between bridging-devices 22B and 22C are marked with a special flag in their header indicating that the receiving bridging-device should handle them as broadcast messages.

It is noted that in this embodiment it is important that both the bridging-devices 22 connected to the link which failed know of the failure. Therefore, each bridging-device 22 which detects a failure preferably verifies that the bridging-device 22 on the other end of the failed link 24A also knows of the failure, as described hereinabove.

Preferably, when link 24A becomes operative, bridging-devices 22B and 22C stop (92) duplicating the broadcast frames.

Alternatively to compensating for the failed link, one of the bridging-devices 22B and 22C leaves (88) cluster 40 and becomes an external bridging-device 28. Preferably, the bridging-device which leaves cluster 40, is determined according to a predetermined rule. The leaving bridging-device, e.g. 22B, blocks its connections to all the bridging-devices 22 except to one bridging-device. Bridging-device 22B notifies the bridging-device to which it remained connected that it is no longer a cluster bridging-device 22. It is noted that in this embodiment no further changes are needed. Specifically, there is no need to change a spanning tree of the network. When link 24A becomes operative (78) the full mesh topology verification routine is preferably run (80). If the full mesh topology of cluster 40 is verified the leaving bridging-device 22B activates (94) all its ports to bridging-devices 22 and thus returns to cluster 40.

It is noted that the above actions performed in case of the failure of a link are not limited to the failure of a single link. Rather, any of the above described actions may be performed for a plurality of inoperative links. Alternatively or additionally, different ones of the actions described above may be performed responsive to failure of different links. For example, compensation for failure of links 24 which connect bridging-devices 22 not connected to external bridging-devices 28 may be performed differently than compensation for failure of links 24 which connect one or two bridging-devices 22 which connect to external bridging-devices 28.

In some preferred embodiments of the present invention, if there does not remain in cluster 20 at least one bridging-device which is connected directly to all the other bridging-devices the bridging-devices resort to the STA.

It is noted that the method of FIG. 2 is completely independent of the number of bridging-devices 22 within cluster 20 and of the number of bridging-devices 28 and the topology of network 30. Specifically, no changes are necessary in the bridging-devices 22 when bridging-devices are added and/or removed from cluster 20 and/or network 30.

Figure 5:
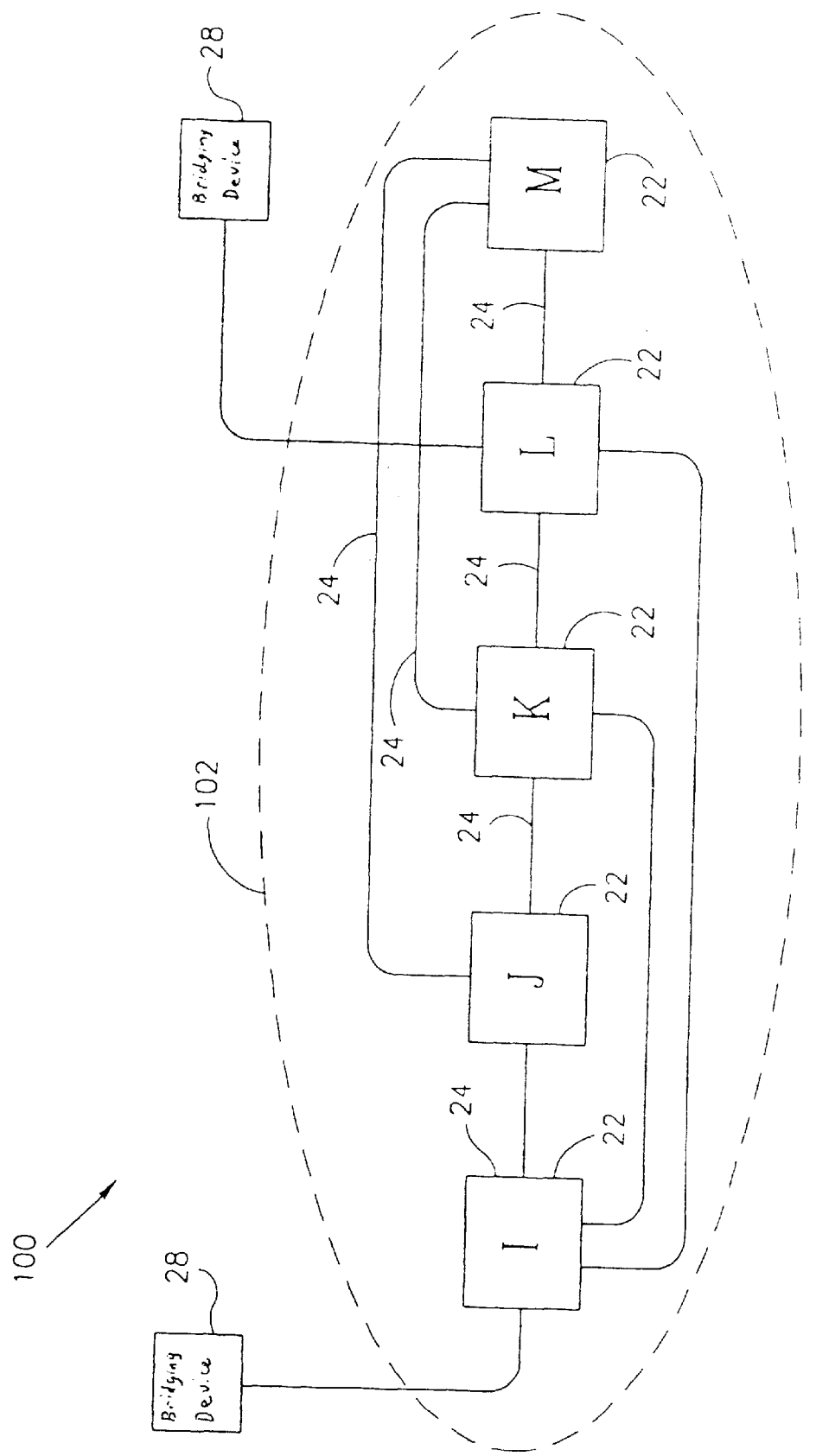
FIG. 5 is a schematic illustration of a network including a cluster which operates with forwarding tables, useful in describing a preferred embodiment of the present invention.

FIG. 5 is a schematic illustration of a network 100 including a cluster 102, useful in describing a preferred embodiment of the present invention. Cluster 102 includes a plurality of bridging-devices 22, not necessarily connected in a full mesh topology, which operate with forwarding tables. Optionally, network 100 comprises external bridging-devices 28 which are connected to one or more of the cluster bridging-devices 22. Table 1 shows exemplary forwarding tables of bridging-devices 22 of cluster 102, in accordance with a preferred embodiment of the present invention. Table 1 includes five forwarding tables identified by letters (I, J, K, L and M) which identify in FIG. 5 the respective bridging-devices 22 in which the forwarding tables reside.

Bridging-devices 22 preferably forward broadcast frames from external bridging-devices 28 through all their ports except the port through which the frame was received. Frames received from other cluster bridging-devices 22 are preferably forwarded according to the entries of the forwarding table of the forwarding bridging-device 22. Preferably, such frames are forwarded to all the neighboring external bridging-devices 28 and to those cluster bridging-devices 22 which are listed in the forwarding table in unconditional entries or entries for which the condition is fulfilled.

For example, when all the links of cluster 102 are operative, a broadcast frame received by bridging-device 22I from an external bridging-device 28 is forwarded through all the internal ports (i.e., the ports leading to cluster bridging-devices 22) of bridging-device 22I. Therefore, the frame is forwarded to bridging-devices 22J, 22K and 22L, but not to 22M which is not directly connected to bridging-device 22I. Bridging-device 22J forwards the frame to bridging-device 22M as required by its forwarding table. Bridging-devices 22K and 22L do not forward the frame. Thus, the frame reaches all bridging-devices 22 in the cluster without being sent to the same bridging-device 22 more than once.

When a link 24 in cluster 102 fails, bridging-devices 22 preferably forward frames using, in addition to the unconditional entries, those entries of their forwarding tables which pertain to the failure of the specific link. In a preferred embodiment of the present invention, notification of the failure is sent to all of bridging-devices 22 in the cluster, by one or more bridging-devices 22 identifying the failure. When the link resumes operation, notification is sent to all of bridging-devices 22 and the entries of the forwarding tables regarding failure of the specific link, are disregarded.

TABLE 1

| received from | send to | condition |
|---|---|---|
| _I_ | | |
| J | L | |
| L | J | |
| K | J | JK failed |
| J | K | JK failed |
| _J_ | | |
| I | M | |
| K | M | KM failed |
| M | K | KM failed |
| _K_ | | |
| M | I | |
| I | L | IL failed |
| L | I, J | IL failed |
| I | J | IJ failed |
| J | I | IJ failed |
| J | M | JM failed |
| M | J | JM failed |
| L | M | LM failed |
| M | L | LM failed |
| _L_ | | |
| I | M | JM or IJ failed |
| K, M | I | IK failed |
| I | K | IK failed |
| M | I | KM failed |
| _M_ | | |
| K | L | KL failed |
| L | K | KL failed |
| J | L | IL or IJ failed |
| L | J | IJ failed |
| J | L | I failed |
| L | J | I failed |

For example, as described in Table 1, when link KL is inoperative, bridging-device 22M forwards frames received from bridging-device 22K to bridging-device 22L and vice versa, to compensate for the failure. It is noted, however, that a single bridging-device 22 does not necessarily handle the forwarding of frames between bridging-devices 22 not connected by a link 24 (or connected by an inoperative link). For example, in Table 1, bridging-device 22J handles forwarding broadcast frames from bridging-device 22I to bridging-device 22M, while bridging-device 22K handles forwarding frames in the other direction. This divides the traffic load between the links of the network.

If link IK fails, bridging-device 22L compensates for the failure by forwarding broadcast frames between bridging-devices 22I and 22K. In addition, bridging-device 22L forwards broadcast frames received from bridging-device 22M to bridging-device 22I since due to the failure of link IK bridging-device 22K does not handle the forwarding.

Entries in the forwarding table may be used for other conditional cases, such as the failure of a bridging-device 22. An example of such an entry is illustrated in Table 1 in the forwarding table of bridging-device 22M. It is noted that entries may have more complex conditions, such as failure of two or more links together. Alternatively or additionally, when more than a predetermined number of links fail, bridging-devices 22 resort to a spanning tree algorithm, as described hereinabove. Further alternatively or additionally, if there does not remain in cluster 20 at least one bridging-device which is connected directly to all the other bridging-devices, the bridging-devices resort to the STA.

Preferably, the forwarding tables are prepared by a system manager configuring network 100. Alternatively, cluster 102 is purchased as a single unit with the forwarding tables already prepared.

It is noted that the forwarding tables shown in Table 1 are only an example, and many other types of forwarding tables may be used, in accordance with preferred embodiments of the invention. Particularly, the forwarding tables may be dependent on different attributes of the received broadcast frames, have different entry keys, or assume other defaults. For example, the forwarding tables may have entries dependent on the connectivity of the network rather then on the origin of the received broadcast frames.

It will be appreciated that the above described methods may be varied in many ways, including, changing the order of steps, and the exact implementation used. It should also be appreciated that the above described description of methods and apparatus are to be interpreted as including apparatus for carrying out the methods and methods of using the apparatus.

The present invention has been described using non-limiting detailed descriptions of preferred embodiments thereof that are provided by way of example and are not intended to limit the scope of the invention. Variations of embodiments described will occur to persons of the art. Furthermore, the terms "comprise," "include," "have" and their conjugates, shall mean, when used in the claims, "including but not necessarily limited to." The scope of the invention is limited only by the following claims:

What is claimed is:

1. A method of distributing a broadcast frame within a network, comprising:
   receiving the broadcast frame in a bridging-device of the network through a receiving port; and
   forwarding the frame to a group of bridging-devices selected responsive to whether the receiving port is an internal port which leads to bridging-devices which are connected with a full mesh topology and are included in a common cluster with the receiving bridging-device and responsive to data with respect to the status of the full mesh topology, wherein forwarding to the group of bridging-devices comprises forwarding through all the ports of the receiving bridging-device not including the receiving port, when the receiving port is not an internal port, forwarding through a group of ports which does not include internal ports of the receiving bridging-device, when the receiving port is an internal port, and forwarding a duplicate frame to at least one of the group of bridging-devices when the data indicates that the full mesh topology is lost.

2. A method according to claim 1, wherein the cluster comprises a stacked switch.

3. A method according to claim 1, wherein the bridging-devices of the cluster are controlled by a single processor.

4. A method according to claim 1, wherein the bridging-devices of the cluster are each controlled by a separate processor.

5. A method according to claim 1, wherein the group of bridging-devices is selected according to an entry to a forwarding table, which entry corresponds to an identity of the receiving port.

6. A method according to claim 1, wherein forwarding to the group of bridging-devices comprises, for frames received from a first bridging-device, forwarding to a second bridging-device which is not connected directly by an operative link to the first bridging-device.

7. A method according to claim 6, wherein the first and second bridging-devices are connected by an inoperative link.

8. A method according to claim 1, wherein the group of bridging-devices is selected responsive to data with respect to connections between bridging-devices of the network.

9. A method according to claim 8, wherein the data with respect to connections between bridging-devices of the network comprises data on the failure of links.

10. A method according to claim 8, wherein the group of bridging-devices is selected according to an entry to a forwarding table which entry is selected responsive to the data with respect to connections of the network.

11. A method according to claim 1, wherein the group of bridging-devices is selected responsive to an identity of a bridging-device forwarding the frame to the receiving port.

12. A method of distributing a broadcast frame within a cluster of bridging-devices which are connected with a full mesh topology which includes at least one loop of unblocked, nonparallel links and bridging-devices, comprising:
   (a) receiving the broadcast frame in a bridging-device belonging to the cluster, which bridging-device is part of the at least one loop;
   (b) forwarding the frame from the receiving bridging-device over at least one link which is part of the loop to neighboring bridging-devices, wherein forwarding to the neighboring bridging-devices comprises forwarding through all ports of the neighboring bridging-device not including the receiving port when the receiving port is not an internal port, and forwarding through a group of ports which does not include internal ports of the neighboring-bridging device when the receiving port is an internal port; and
   (c) forwarding a duplicate frame from the receiving bridging device to at least one neighboring bridging-device responsive to data with respect to the status of the full mesh topology indicating that the full mesh topology is lost.

13. A method according to claim 12, wherein receiving the frame comprises receiving the frame from a bridging-device external to the cluster.

14. A method according to claim 12, wherein the cluster comprises an entire local area network.

15. A method according to claim 12, wherein forwarding the link comprises forwarding over a plurality of links which are part of the loop.

16. A method of distributing broadcast frames within a network by a bridging-device which has a plurality of ports leading to a plurality of neighboring bridging-devices which are connected with a full mesh topology, comprising:
   receiving a broadcast frame through a receiving port;
   selecting fewer than all of the active ports in a group, including one port for each neighboring bridging-device except for the bridging-device connected to the receiving port, independent of the contents of the frame; and
   forwarding the received broadcast frame through the selected ports, wherein receiving the frame comprises receiving the frame from a bridging-device included in a common cluster with the receiving bridging-device, said common cluster including at least one active loop, and forwarding the frame comprises forwarding the frame only to bridging-devices not included in the cluster, forwarding through all ports of the receiving bridging-device not including the receiving port when the receiving port is not an internal port, forwarding through a group of ports that does not include internal ports of the receiving bridging-device when the receiving port is an internal port, and forwarding a duplicate frame from the receiving bridging-device to at least one neighboring bridging-device responsive to data with respect to the status of the full mesh topology indicating that the full mesh topology is lost.

17. A method according to claim 16, wherein selecting the ports comprises selecting responsive to an identity of the receiving port.

18. A method according to claim 16, wherein selecting the ports comprises selecting responsive to data regarding connections between bridging-devices of the network.

19. A method of distributing broadcast frames within a full mesh topology network by a bridging-device having a plurality of ports, comprising:

determining a status of the full mesh topology of the network, indicating whether the full mesh topology is lost;

running at least one procedure of a plurality of procedures which determines identities of ports which should be blocked to avoid having an unblocked loop in the network; and forwarding data broadcast frames through the ports which should be blocked according to the at least one procedure, wherein forwarding the data frames comprises forwarding through ports of which identities are determined by the at least one procedure based on the status of the full mesh topology.

20. A method according to claim 19, wherein running the at least one procedure comprises running a single procedure.

21. A method according to claim 19, wherein forwarding the frames comprises forwarding through the links which should be blocked independent of the contents of the frames.

22. A method according to claim 19, wherein forwarding the frames comprises forwarding through the links which should be blocked independent of a VLAN with which the frames are associated.

23. A method according to claim 19, wherein running the at least one procedure comprises running a procedure which implements a spanning tree algorithm.

24. A method according to claim 23, wherein running the at least one procedure comprises running a procedure which is implemented on substantially all the bridging-devices of the network.

25. A method according to claim 19, wherein forwarding the data frames comprises forwarding through ports of which identities were determined by the procedure only when a connectivity condition of the network is fulfilled.

26. A method according to claim 25, wherein the network has links and wherein forwarding the data frames comprises forwarding through ports of which identities were determined by the at least one procedure only when all the links of the network are operative.

27. A method according to claim 25, wherein the network has links and wherein forwarding the data frames comprises forwarding through ports of which identities were determined by the at least one procedure only if less than a predetermined number of links is inoperative.

* * * * *